United States Patent
Sakamoto

(10) Patent No.: US 8,993,162 B2
(45) Date of Patent: Mar. 31, 2015

(54) POSITIVE ELECTRODE FOR LITHIUM SECONDARY BATTERY AND PRODUCTION METHOD OF SAME

(75) Inventor: Hiroyuki Sakamoto, Toyohashi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 675 days.

(21) Appl. No.: 13/144,703

(22) PCT Filed: Dec. 8, 2009

(86) PCT No.: PCT/JP2009/070511
§ 371 (c)(1),
(2), (4) Date: Jul. 15, 2011

(87) PCT Pub. No.: WO2010/084669
PCT Pub. Date: Jul. 29, 2010

(65) Prior Publication Data
US 2011/0274971 A1 Nov. 10, 2011

(30) Foreign Application Priority Data
Jan. 26, 2009 (JP) ................................. 2009-014706

(51) Int. Cl.
*H01M 4/62* (2006.01)
*H01M 4/64* (2006.01)
(Continued)

(52) U.S. Cl.
CPC ............... *H01M 4/621* (2013.01); *H01M 4/13* (2013.01); *H01M 4/139* (2013.01); *H01M 4/622* (2013.01); *H01M 4/624* (2013.01);
(Continued)

(58) Field of Classification Search
CPC ......... H01M 4/62; H01M 4/621; H01M 4/64; H01M 4/623; H01M 4/139
USPC ...................... 429/217, 233; 427/58; 29/623.5
See application file for complete search history.

(56) References Cited

U.S. PATENT DOCUMENTS

| 8,753,780 B2 * | 6/2014 | Takahata ........................ 429/232 |
| 2003/0118904 A1 * | 6/2003 | Hosokawa et al. ............ 429/217 |

(Continued)

FOREIGN PATENT DOCUMENTS

| JP | 2002-110249 | 4/2002 | |
| JP | 2002110249 A * | 4/2002 | ............ H01M 10/40 |

(Continued)

OTHER PUBLICATIONS

International Search Report in International Application No. PCT/JP2009/070511; Mailing Date: Mar. 9, 2010.

*Primary Examiner* — Karie O'Neill Apicella
(74) *Attorney, Agent, or Firm* — Finnegan, Henderson, Farabow, Garrett & Dunner, LLP

(57) ABSTRACT

A positive electrode for a lithium secondary battery provided by the present invention includes an electrically conductive layer and an active material layer on a surface of a positive electrode current collector. The electrically conductive layer contains at least one type of water-insoluble polymer that is soluble in an organic solvent as a binder, the active material layer contains at least one type of water-soluble and/or water-dispersible polymer that dissolves or disperses in water as a binder, and a mass ratio (B/A) of mass (B) per unit surface area of the binder in the active material layer to mass (A) per unit surface area of the binder in the electrically conductive layer satisfies a relationship of $0.06 \leq B/A \leq 0.35$.

9 Claims, 3 Drawing Sheets

(51) Int. Cl.
*H01M 4/139* (2010.01)
*B05D 5/12* (2006.01)
*H01M 4/13* (2010.01)
*H01M 10/052* (2010.01)
*H01M 10/0585* (2010.01)
*H01M 4/02* (2006.01)

(52) U.S. Cl.
CPC ....... *H01M 10/052* (2013.01); *H01M 10/0585* (2013.01); *H01M 2004/021* (2013.01); *Y02E 60/122* (2013.01); *Y02T 10/7011* (2013.01)
USPC ............. 429/217; 427/58; 429/233; 29/623.5

(56) References Cited

U.S. PATENT DOCUMENTS

| | | | |
|---|---|---|---|
| 2006/0222952 | A1 | 10/2006 | Kono et al. |
| 2008/0299457 | A1* | 12/2008 | Muraoka et al. ............... 429/217 |
| 2011/0027649 | A1 | 2/2011 | Abe |

FOREIGN PATENT DOCUMENTS

| | | |
|---|---|---|
| JP | 2003-157852 | 5/2003 |
| JP | 2006-4739 | 1/2006 |
| JP | 2006-134777 | 5/2006 |
| JP | 2009-252396 | 10/2009 |

\* cited by examiner

MASS (B) OF CMC PER UNIT SURFACE AREA
/ MASS (A) OF PVDF PER UNIT SURFACE AREA

POSITIVE ELECTRODE FOR LITHIUM SECONDARY BATTERY AND PRODUCTION METHOD OF SAME

CROSS-REFERENCE TO RELATED APPLICATIONS

This application is a national phase application of International Application No. PCT/JP2009/070511, filed Dec. 8, 2009, and claims the priority of Japanese Application No. 2009-014706, filed Jan. 26, 2009, the contents of both of which are incorporated herein by reference.

TECHNICAL FIELD

The present invention relates to a positive electrode for a lithium secondary battery including an electrically conductive layer on a surface of the positive electrode current collector and an active material layer laminated on the electrically conductive layer, and a production method thereof.

Furthermore, the present application claims priority based on Japanese Patent Application No. 2009-14706 filed on Jan. 26, 2009, the content of which is incorporated herein by reference.

BACKGROUND ART

The importance of secondary batteries such as lithium secondary batteries or nickel hydrogen batteries has grown in recent years as vehicle-mounted power supplies used in vehicles powered by electricity and as power supplies installed in personal computers, portable terminals and other electrical products. In particular, lithium secondary batteries are expected to be preferably used as high-output, vehicle-mounted power supplies due to their light weight and high energy density.

A typical configuration of this type of lithium secondary battery has a positive electrode active material layer (and more specifically, a positive electrode active material layer and negative electrode active material layer) on a surface of a positive electrode collector that is capable of reversibly occluding and releasing lithium ions. For example, in the case of a positive electrode, the positive electrode active material layer is formed by coating onto the positive electrode current collector a paste-like composition for forming a positive electrode active material layer (including a slurry-like composition or ink-like composition, and to be simply referred to as an "electrode paste") that is prepared by mixing a positive electrode active material such as a lithium transition complex oxide with a powder of a highly electrically conductive material (electrically conductive material) and a binder and the like in a suitable solvent.

Here, in the case the electrode paste is prepared using an organic solvent for the solvent, a water-insoluble polymer that is insoluble in an organic solvent such as polyvinylidene fluoride (PVDF) is used for the binder. On the other hand, in the case the electrode paste is prepared using an aqueous solvent for the solvent, a water-soluble polymer or water-dispersible polymer such as polytetrafluoroethylene (PTFE) or carboxymethyl cellulose (CMC) is preferably used for the binder. Among these, an electrode paste that uses the latter aqueous solvent (to be referred to as an "aqueous electrode paste") offers the advantage of reducing the overall environmental burden since it requires a smaller amount of organic solvent and other industrial waste while also not resulting in corresponding equipment and processing costs.

However, the aqueous electrode paste described above tends to cause an increase in pH attributable to its high reactivity with water depending on the contents of the positive electrode active material (such as in the case of a lithium-nickel-based complex oxide having a composition represented by the formula: $LiNiO_2$). When this aqueous electrode paste having a high pH is coated onto a metal positive electrode current collector (such as that made of aluminum), a compound demonstrating high electrical resistance (such as an oxide or hydroxide) is formed on the surface of the current collector, thereby potentially causing corrosion of the positive electrode current collector and an increase in internal resistance of the battery.

Patent Document 1 is an example of the prior art relating to a positive electrode of a lithium secondary battery that uses this type of aqueous electrode paste. According to the technology described in Patent Document 1, by interposing an electrically conductive layer containing an electrically conductive material formed with a non-aqueous electrode paste between a positive electrode current collector and an active material layer formed with an aqueous electrode paste, formation of compounds having high electrical resistance that cause corrosion of the positive electrode current collector is prevented.

Patent Document 1: Japanese Patent Application Laid-open No. 2006-4739

DISCLOSURE OF THE INVENTION

However, among the applications of lithium secondary batteries, lithium secondary batteries may be used over a long period of time in a state of being repeatedly charged and discharged at a high rate (rapid charging and discharging). Lithium secondary batteries used as motive power sources of vehicles (and typically, automobiles and particularly hybrid vehicles and electric vehicles) are a typical example of this type of use. Here, in the above-mentioned Patent Document 1, in contrast to a water-soluble polymer and/or water-dispersible polymer being used as a binder of an electrically conductive layer, a water-insoluble polymer is used as a binder of an active material layer, and since these layers composed of different types of binders are laminated in this manner, bonding strength between the layers weakens resulting in the risk of interlayer separation if used over a long period of time under conditions of a high rate of repeated charging and discharging as a vehicle-mounted, high-output power supply.

Therefore, in order to solve the problems of the prior art relating to a positive electrode for a lithium secondary battery, an object of the present invention is to provide a positive electrode for a lithium secondary battery provided with a structure in which layers of different binders are mutually laminated that is resistant to interlayer separation (has high interlayer adhesion) and demonstrates superior quality by suppressing increases in internal resistance even when subjected to a high rate of charging and discharging, and a production method thereof. In addition, another object of the present invention is to provide a lithium secondary battery provided with this electrode and a vehicle equipped with this lithium secondary battery.

In order to realize the objects described above, the present invention provides a positive electrode for a lithium secondary battery including: an electrically conductive layer laminated on a surface of a positive electrode current collector; and an active material layer laminated on the electrically conductive layer. The electrically conductive layer of the positive electrode for a lithium secondary battery according to the present invention contains at least one type of water-insoluble polymer that is soluble in an organic solvent as a binder and an electrically conductive material, while the active material layer contains at least one type of water-soluble polymer and/or water-dispersible polymer that dissolves or disperses in water (to be generically referred to as an "aqueous polymer") as a binder and a positive electrode active material. In addition, a mass ratio (B/A) of mass (B) per unit surface area of the binder in the active material layer to mass (A) per unit surface area of the binder in the electrically conductive layer satisfies a relationship of $0.06 \leq B/A \leq 0.35$.

Furthermore, in the present description, a "lithium secondary battery" refers to a secondary battery that uses lithium ions as electrolyte ions and in which charging and discharging are realized by the migration of lithium ions between positive and negative electrodes. In general, a secondary battery referred to as a lithium ion battery is a typical example that is included in a lithium secondary battery in the present description.

In addition, in the present description, a "positive electrode active material" refers to an active material on the side of a positive electrode that is capable of reversibly occluding and releasing (and typically, inserting and eliminating) a chemical species serving as a charge carrier in a secondary battery (here, lithium ions).

The positive electrode for a lithium secondary battery provided by the present invention is provided with a laminated structure in which an electrically conductive layer containing an electrically conductive material composed of a non-aqueous electrode paste is interposed between a positive electrode current collector and an active material layer composed of an aqueous electrode paste, and different types of materials are used in the binders contained in the active material layer and the electrically conductive layer. Namely, a water-soluble polymer and/or water-dispersible polymer of a type that dissolves or disperses in water is used for the binder contained in the active material layer, while a water-insoluble polymer that is soluble in an organic solvent is used for the binder contained in the electrically conductive layer. The mass ratio (B/A) of the mass (B) per unit surface area of the binder in the active material layer to the mass (A) per unit surface area of the binder in the electrically conductive layer satisfies the relationship of $0.06 \leq B/A \leq 0.35$. In a positive electrode for a lithium secondary battery in which layers are mutually laminated such that the mass ratio of the binder per unit surface area in each layer satisfies the relationship described above, even if two layers respectively containing different types of binders are laminated, adhesion between the layers is extremely superior, thereby resulting in resistance to interlayer separation even when subjected to a high rate of charging and discharging. Consequently, formation of compounds having high electrical resistance that cause corrosion of the positive electrode current collector is suppressed. As a result, a positive electrode of a lithium secondary battery of superior quality can be provided in which the layers thereof are strongly adhered.

In addition, in another preferable aspect of the positive electrode for a lithium secondary battery provided by the present invention, a content of the electrically conductive material in the electrically conductive layer is 20% by mass or more to 50% by mass or less based on a value of 100% by mass for a total amount of the water-insoluble polymer and the electrically conductive material in the electrically conductive layer. The electrically conductive layer is required to fulfill the role of inhibiting direct contact between water (and typically, water contained in the aqueous electrode paste) and the positive electrode current collector as well as maintain electrical conductivity to a degree that does not allow an excessive increase in resistance between the active material layer and the positive electrode current collector. Here, although increasing the content ratio of the electrically conductive material in the electrically conductive layer leads to improvement of electrical conductivity, simply increasing this ratio results in a relative decrease in the content ratio of the binder, thereby causing a decrease in interlayer adhesion. Conversely, increasing the content ratio of the binder decreases electrically conductivity due to a relative decrease in the content ratio of the electrically conductive material. Therefore, adhesion can be improved while maintaining electrical conductivity by using a positive electrode in which the content of the electrically conductive material in the electrically conductive layer is 20% by mass or more to 50% by mass or less based on a value of 100% by mass for the total amount of water-insoluble polymer serving as a binder and the electrically conductive material in the electrically conductive layer, or in other words, by making the content of the electrically conductive material in the electrically conductive layer half or less of the total amount of the electrically conductive layer. As a result thereof, a high-quality positive electrode for a lithium ion secondary battery can be provided that demonstrates high interlayer adhesion and suppresses increases in internal resistance.

Moreover, in another preferable aspect of the positive electrode for a lithium secondary battery provided by the present invention, polyvinylidene fluoride (PVDF) is contained as a binder in the electrically conductive layer, and carboxymethyl cellulose (CMC) is contained as a binder in the active material layer. Higher adhesion can be obtained by providing layers in which these binders are contained. As a result thereof, a positive electrode for a lithium secondary battery can be provided that is provided with a laminated structure that is resistant to interlayer separation even when subjected to a high rate of charging and discharging.

In addition, in another aspect of the positive electrode for a lithium secondary battery preferably provided by the present invention, an electrically conductive material is contained in the active material layer. As a result of further adding an electrically conductive material to the binder and the positive electrode active material for the composition contained in the active material layer, electrically conductive pathways between the active material layer composed of this composition and the electrically conductive layer are improved. As a result, a positive electrode for a lithium secondary battery can be provided in which increases in internal resistance are suppressed.

In addition, the present invention provides a method for producing a positive electrode for a lithium secondary battery in another aspect thereof. Namely, the production method provided by the present invention is a method for producing a positive electrode for a secondary lithium battery provided with a laminated structure formed of an electrically conductive layer on a surface of a positive electrode current collector and an active material layer laminated on the electrically conductive layer, the method including: forming the electrically conductive layer using a composition containing at least one type of water-insoluble polymer that is soluble in an organic solvent as a binder and an electrically conductive material; and forming the active material layer using a composition containing at least one type of water-soluble polymer and/or water-dispersible polymer (aqueous polymer) that dissolves or disperses in water as a binder and a positive electrode active material. In the production method of the present invention, the laminated structure is formed so that a mass ratio (B/A) of mass (B) per unit surface area of the binder in the active material layer to mass (A) per unit surface area of the binder in the electrically conductive layer satisfies a relationship of $0.06 \leq B/A \leq 0.35$.

In a bilayer structure consisting of an active material layer composed of a composition containing a water-soluble polymer and/or water-dispersible polymer as a binder and an electrically conductive layer composed of a composition containing a water-insoluble polymer as a binder, adhesive strength of the layers decreases resulting in increased susceptibility to interlayer separation due to long-term battery use, and particularly use under conditions of a high rate of charging and discharging. However, by forming a laminated structure such that the mass ratio of the binder per unit surface area in each layer satisfies the relationship described above, high adhesion that is resistant to interlayer separation is provided even when subjected to a high rate of charging and discharging. As a result, formation of compounds having high electrical resistance that cause corrosion of the positive electrode current collector is suppressed, and a method can be provided for producing a positive electrode for a lithium secondary battery that has superior quality.

In addition, in a preferable aspect of the production method of a positive electrode for a lithium secondary battery provided by the present invention, the electrically conductive layer is laminated such that a content of the electrically conductive material in the electrically conductive layer is 20% by mass or more to 50% by mass or less based on a value of 100% by mass for a total amount of the water-insoluble polymer and the electrically conductive material in the electrically conductive layer. Although increasing the content ratio of the electrically conductive material in the electrically conductive layer leads to improvement of electrical conductivity, this results in a relative decrease in the content ratio of the binder thereby causing a decrease in interlayer adhesion. Therefore, by laminating the electrically conductive layer on the positive electrode current collector such that the content of the electrically conductive material in the electrically conductive layer is 20% by mass or more to 50% by mass or less, adhesion between the electrically conductive layer and the active material layer is improved while maintaining electrical conductivity. As a result thereof, a method can be provided for producing a positive electrode for a lithium secondary battery that demonstrates high interlayer adhesion and suppresses increases in internal resistance.

Moreover, in another preferable aspect of the production method of a positive electrode for a lithium secondary battery provided by the present invention, polyvinylidene fluoride (PVDF) is used for the binder in the electrically conductive layer, and carboxymethyl cellulose (CMC) is used for the binder in the active material layer. If a laminated structure is formed that is composed of an electrically conductive layer and an active material layer that use compositions respectively containing these binders, a positive electrode can be obtained that is resistant to interlayer separation even when subjected to a high rate of charging and discharging. As a result, a positive electrode for a lithium secondary battery can be provided in which increases in internal resistance are suppressed.

In addition, according to the present invention, provided is a lithium secondary battery including any of the positive electrodes disclosed herein (which may be a positive electrode produced according to any of the production methods disclosed herein). Moreover, a vehicle including the lithium secondary battery is also provided. The positive electrode for a lithium secondary battery provided by the present invention is able to demonstrate quality suitable for use as a lithium secondary battery installed in a vehicle (by, for example, suppressing increases in internal resistance). Thus, this lithium secondary battery can be preferably used as a power source for a motor installed in a vehicle such as an automobile provided with a motor in the manner of a hybrid vehicle, electric vehicle or fuel cell vehicle.

BEST MODE FOR CARRYING OUT THE INVENTION

The following provides an explanation of preferred embodiments of the present invention. Furthermore, those matters required for carrying out the present invention other than matters specifically mentioned in the present description can be understood to be design matters for a person with ordinary skill in the art based on the prior art in the relevant field. The present invention can be carried out based on the contents disclosed in the present description and common general technical knowledge in the relevant field.

The positive electrode for a lithium secondary battery according to the present invention is provided with an electrically conductive layer on a surface of a positive electrode current collector and an active material layer laminated on the electrically conductive layer. Although the following provides a detailed explanation using as an example a prismatic lithium secondary battery (lithium ion battery) constructed using a positive electrode provided with the above-mentioned laminated structure disclosed herein, the present invention is not intended to be limited to this embodiment. The lithium secondary battery may be any battery in which charging and discharging are realized by migration of lithium ions as charge carriers, or in other words, there are no particular limitations on the configuration of the negative electrode, battery case, electrolyte and the like. For example, the battery case can have a rectangular shape, flat shape or cylindrical shape, and the configuration of the negative electrode or electrolyte can be suitably altered according to the application (and typically, vehicle mounting).

Furthermore, in the following drawings, the same reference symbols are used to indicate those members or sites demonstrating the same action, and duplicate explanations may be omitted or simplified. In addition, dimensional relationships in each of the drawings (such as length, width or thickness) do not reflect actual dimensional relationships.

Figure 1:
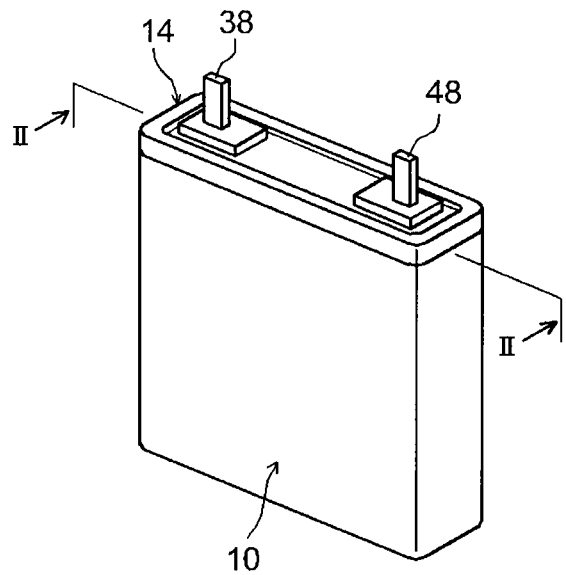
FIG. 1 is a perspective view schematically showing the external appearance of a lithium secondary battery according to an embodiment.
Figure 2:
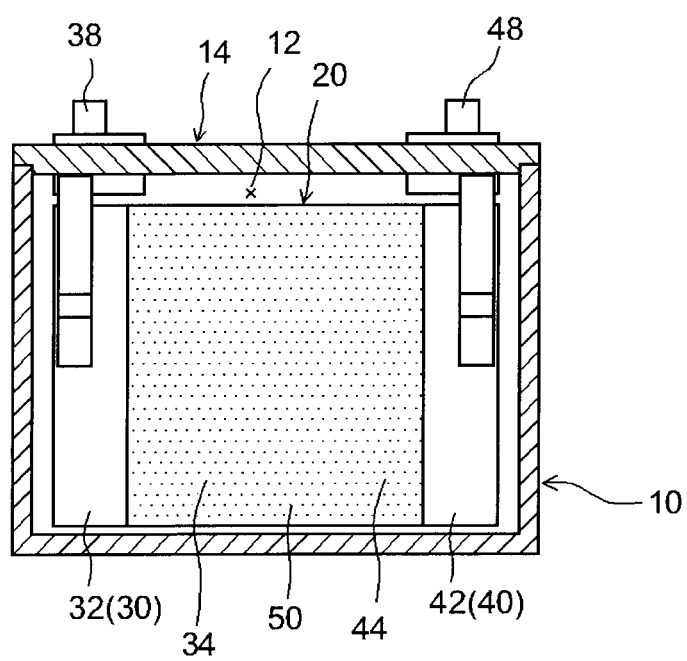
FIG. 2 is a cross-sectional view taken along line II-II in FIG. 1.
Figure 3:
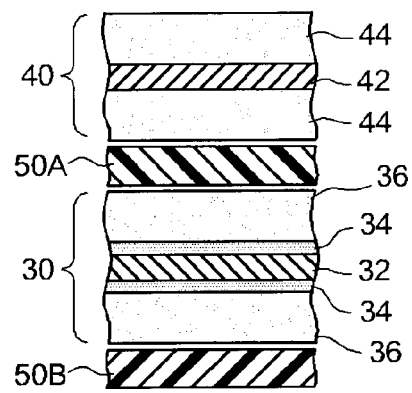
FIG. 3 is a cross-sectional view showing a positive electrode, negative electrode and separator that compose a wound-type electrode body according to an embodiment.

FIG. 1 is a perspective view schematically showing a prismatic lithium secondary battery 100 according to an embodiment. In addition, FIG. 2 is a cross-sectional view taken along line II-II in FIG. 1. Moreover, FIG. 3 is a cross-sectional view showing a positive electrode, a negative electrode and a separator that compose a wound-type electrode body according to an embodiment.

As shown in FIG. 1, the lithium secondary battery 100 according to the present embodiment is provided with a prismatic battery case 10 in the shape of a rectangular parallelepiped, and a lid 14 that covers an opening 12 of the case 10. A flat electrode body (wound-type electrode body 20) and an electrolyte can be housed within the battery case 10 by inserting through the opening 12. In addition, a positive electrode terminal 38 and a negative electrode terminal 48 for external connection are provided in the lid 14, and a portion of each of the terminals 38 and 48 protrudes from the surface of the lid 14.

As shown in FIG. 2, the wound-type electrode body 20 is housed within the case 10 in the present embodiment. The electrode body 20 is composed of a positive electrode sheet 30, in which an electrically conductive layer 34 and an active material layer 36 are formed on the surface of a positive electrode current collector 32 in the form of a long sheet, a negative electrode sheet 40, in which a negative electrode active material layer 44 is formed on the surface of a negative electrode current collector 42 in the form of a long sheet, and separators 50A and 50B in the form of long sheets. As shown in FIG. 3, the positive electrode sheet 30 and the negative electrode sheet 40 are wound by superimposing with the two separators 50A and 50B, and the resulting wound-type electrode body 20 is formed to have a flat shape by flattening the wound-type electrode 20 by pressing in the direction of both sides.

In addition, in the wound positive electrode sheet 30, the positive electrode current collector 32 is exposed on one end along the lengthwise direction thereof where the electrically conductive layer 34 and the active material layer 36 are not formed, while in the wound negative electrode sheet 40 as well, the negative electrode current collector 42 is exposed on one end along the lengthwise direction thereof where the negative electrode active material layer 44 is not formed. The positive electrode terminal 38 is joined to the exposed end of the positive electrode current collector 32, while the negative electrode terminal 48 is joined to the exposed end of the negative electrode current collector 42, and are electrically connected to the positive electrode sheet 30 or the negative electrode sheet 40 of the wound-type electrode body 20 formed into a flat shape as previously described. The positive and negative electrode terminals 38 and 48 and the positive and negative electrode current collectors 32 and 42 can be respectively joined by, for example, ultrasonic welding or resistance welding.

First, an explanation is provided of each constituent of a positive electrode of the lithium secondary battery 100 according to the present embodiment. The positive electrode for a lithium secondary battery disclosed herein (and typically, the positive electrode sheet 30) is provided with the electrically conductive layer 34 laminated on a surface of the positive electrode current collector 32, and the active material layer 36 formed on the electrically conductive layer 34, and the electrically conductive layer 34 and the active material layer 36 are respectively composed of different compositions. The electrically conductive layer 34 contains at least one type of water-insoluble polymer that is soluble in an organic solvent as a binder and an electrically conductive material. On the other hand, the active material layer 36 contains at least one type of water-soluble polymer and/or water-dispersible polymer that dissolves or disperses in water as a binder and a positive electrode active material.

An electrically conductive member composed of a metal having favorable electrical conductivity is used for the positive electrode current collector 32. For example, aluminum or an alloy composed mainly of aluminum can be used. There are no particular limitations on the shape of the positive electrode current collector 32 since it can vary corresponding to the shape and the like of the lithium secondary battery, and can be of various shapes such as a rod, plate, sheet, foil or mesh. In the present embodiment, the positive electrode current collector 32 is used that is made of aluminum and is in the form of a sheet, and can be preferably used in the lithium secondary battery 100 provided with the wound-type electrode body 20.

The electrically conductive material used in the positive electrode of the lithium secondary battery 100 disclosed herein may be that conventionally used in this type of secondary battery, and is not limited to a specific electrically conductive material. For example, a carbon material such as carbon powder or carbon fiber can be used. Examples of carbon powders that can be used include various types of carbon black (such as acetylene black, furnace black or ketjen black) and graphite powder. One type or two or more types thereof may be used in combination.

In addition, a preferable mean particle diameter of the electrically conductive material (as determined by TEM and to apply similarly hereinafter) is 1 μm or less (for example, 500 nm or less and preferably 100 nm or less). Since electrical conductivity is improved with an electrically conductive layer formed using an electrically conductive material provided with this mean particle diameter, a resistance of the electrically conductive layer can be held to roughly 20 mΩ·cm$^2$ or less. This effect is prominently obtained particularly with carbon black consisting mainly of acetylene black having a mean particle diameter of 1 μm or less.

In addition, the binder contained in the electrically conductive layer 34 according to the present embodiment is a water-insoluble polymer that is soluble in an organic solvent and insoluble in water. Examples of this type of polymer include polyvinylidene fluoride (PVDF), polyvinylidene chloride (PVDC), polyacrylonitrile (PAN), polypropylene oxide (PPO) and poly(ethylene oxide-propylene oxide) copolymer (PEO-PPO). A binder that is used particularly preferably is PVDF.

On the other hand, the binder contained in the positive electrode active material layer 36 according to the present embodiment is an aqueous polymer, namely a water-soluble polymer and/or water-dispersible polymer that is insoluble in an organic solvent and dissolves or disperses in water. Examples of polymers that dissolve in water include various types of cellulose derivatives such as carboxymethyl cellulose (CMC), methyl cellulose (MC), cellulose acetate phthalate (CAP), hydroxypropyl methyl cellulose (HPMC) or hydroxypropyl methyl cellulose phthalate (HPMCP). In addition, examples of polymers that disperse in water include polyethylene oxide (PEO), fluorine-based resins such as polytetrafluoroethylene (PTFE), tetrafluoroethylene-perfluoroalkyl vinyl ether copolymer (PFA), tetrafluoroethylene-hexafluoropropylene copolymer (FEP) or ethylene-tetrafluoroethylene copolymer (ETFE), vinyl acetate copolymers, and rubbers such as styrene-butadiene block copolymer (SBR), acrylic acid-modified SBR resin (SBR-based latex) and gum arabic. A binder that is used particularly preferably is CMC.

Moreover, a particulate active material capable of occluding and releasing lithium ions is used for the positive electrode active material contained in the active material layer 36 used in the positive electrode of the lithium secondary battery 100 disclosed herein. Known oxide-based positive electrode active materials having a laminated structure or oxide-based positive electrode active materials having a spinel structure can be preferably used for this type of positive electrode active material of a lithium secondary battery. Examples thereof include lithium transition metal complex oxides such as lithium-nickel-based complex oxides, lithium-cobalt-based complex oxides or lithium-manganese-based complex oxides.

Here, the lithium-nickel-based complex oxides refer to oxides having lithium (Li) and nickel (Ni) as constituent metal elements thereof, and includes oxides containing at least one type of metal element other than lithium and nickel (namely, a transition metal element and/or typical metal element other than Li and Ni) typically at a ratio that is less than that of nickel (as the number of atoms, and referring to a ratio such that, in the case of containing two or more types of metal elements other than Li and Ni, the total amount of these metal elements is less than that of Ni). Examples of the metal elements other than Li and Ni include one type or two or more types of metal elements selected from the group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce). Furthermore, this applies similarly to the lithium-cobalt-based complex oxides and the lithium-manganese-based complex oxides.

In addition, an olivine-type lithium phosphate represented by the general formula: $LiMPO_4$ (wherein, M represents at least one type of element selected from the group consisting of Co, Ni, Mn and Fe, and examples of which include $LiFePO_4$ and $LiMnPO_4$) may also be used for the positive electrode active material.

A lithium transition metal complex oxide powder (to also be referred to as a particulate active material) prepared and provided using a conventional known method, for example, can be used directly for the lithium transition metal complex oxide. For example, several raw material compounds suitably selected corresponding to their atomic compositions can be mixed at a prescribed molar ratio to prepare the oxide by firing using suitable means. In addition, a particulate lithium transition metal oxide powder substantially composed of secondary particles having a desired mean particle diameter and/or particle size distribution can be obtained by crushing, granulating and sizing a fired material using suitable means. Furthermore, the preparation method per se of the lithium transition metal oxide powder is not intended to characterize the present invention in any way.

The following provides an explanation of the positive electrode production method according to the present embodiment. The method disclosed herein consists of applying a composition for forming an electrically conductive layer onto a surface of the positive electrode current collector 32 (both sides or only one side of the current collector corresponding to the form and/or application), followed by laminating the active material layer 36 by applying a composition for forming an active material layer onto the formed electrically conductive layer 34.

First, the composition for forming an electrically conductive layer is a paste-like composition prepared by mixing at least one type of water-insoluble polymer that is soluble in an organic solvent but insoluble in water as a binder, an electrically conductive material, and an organic solvent (including a slurry-like composition and ink-like composition, and to be simply referred to as a "non-aqueous electrode paste"). For example, the non-aqueous electrode paste for forming an electrically conductive layer can be prepared by adding a suitable electrically conductive material (such as carbon powder) and a binder (such as PVDF) to a suitable non-aqueous solvent at a suitable mass ratio and mixing. Examples of preferable non-aqueous solvents (organic solvents) added in the preparation of the non-aqueous electrode paste include N-methyl-2-pyrrolidone (NMP), methyl ethyl ketone and toluene.

In order to form the electrically conductive layer 34 having superior adhesive performance using the non-aqueous electrode paste for forming an electrically conductive layer, the electrically conductive material and the water-insoluble polymer are preferably mixed so that the content of the electrically conductive material based on a value of 100% by mass for the total amount of the electrically conductive material and the water-insoluble polymer (binder) is 20% by mass or more to 50% by mass or less (more preferably 20% by mass or more to 40% by mass or less and particularly preferably 20% by mass or more to 35% by mass or less). In the case the content of the electrically conductive material is greater than 50% by mass, although electrical conductivity improves, separation occurs due to decreased adhesion, which is undesirable since this increases internal resistance of the battery. On the other hand, in the case the content of the electrically conductive material is less than 20% by mass, this leads to a decrease in electrical conductivity (namely, a decrease in the number of electrically conductive pathways), thereby making this undesirable. However, adhesion can be improved while maintaining electrical conductivity by making the content of the electrically conductive material contained in the electrically conductive layer 34 within the above-mentioned ranges, namely equal to half or less the total amount of the electrically conductive layer.

The electrically conductive layer 34 can then be formed by applying the prepared non-aqueous electrode paste for forming an electrically conductive layer onto a surface of the positive electrode current collector 32 and drying the solvent contained in the paste. A technique similar to conventionally known methods can be suitably employed to apply the non-aqueous electrode paste for forming an electrically conductive layer to the positive electrode current collector 32. For example, a coating device such as a slit coater, gravure coater, die coater or comma coater can be used. In addition, the electrically conductive layer 34 can be adjusted to a desired thickness by compressing after drying as necessary. A conventionally known compression method such as roll pressing or plate pressing can be employed for the compression method. In addition, the thickness may be measured with a film thickness meter followed by adjusting the pressing pressure and repeating compression several times until the desired thickness is reached.

Furthermore, although there are no particular limitations on the coated thickness provided adequate electrically conductive pathways can be secured in the electrically conductive layer 34, for example, the non-aqueous electrode paste is preferably coated to a thickness of 0.1 μm or more to 5.0 μm or less (and preferably 1.0 μm or more to 4.0 μm or less) per side of the positive electrode current collector 32. In the case the coated thickness is 5.0 μm or more, electrical conductivity decreases and battery capacity retention rate becomes small. On the other hand, in the case the coated thickness is 0.1 μm or less, the electrically conductive layer 34 interposed between the positive electrode current collector 32 and the active material layer 36 is excessively thin, thereby resulting in the risk of corrosion of the current collector 32 and making this undesirable.

Moreover, a preferable coated amount per unit surface area of the positive electrode current collector 32, namely the total amount of the electrically conductive material and the water-insoluble polymer (g/m$^2$), is 0.25 g/m$^2$ or more to 5.0 g/m$^2$ or less per side of the current collector (and preferably 1.7 g/m$^2$ or more to 3.2 g/m$^2$ or less per side of the current collector).

After coating the non-aqueous electrode paste for forming an electrically conductive layer onto the positive electrode current collector 32, the current collector is preferably heated to a maximum temperature within the range of 140° C. to 150° C. using a suitable dryer. As a result of this heat treatment, in addition to being able to rapidly remove the organic solvent in the composition for forming an electrically conductive layer, the degree of crystallization of the water-insoluble polymer contained in the composition for forming an electrically conductive layer is enhanced to a preferable degree. Thus, the electrically conductive layer 34 can be formed to a prescribed thickness on a surface of the current collector.

After having laminated the electrically conductive layer 34 onto a surface of the positive electrode current collector 32 in the manner described above, a composition for forming an active material layer is applied to the electrically conductive layer 34 to form the active material layer 36. The composition for forming an active material layer is a paste-like composition (aqueous electrode paste) prepared by mixing a positive electrode active material, at least one type of water-soluble polymer and/or water-dispersible polymer as a binder that is insoluble in organic solvent but dissolves or disperses in water, and an aqueous solvent (typically, water). This aqueous electrode paste for forming an active material layer can be prepared by, for example, adding at least one type of suitable positive electrode active material (such as a lithium transition metal complex oxide such as LiNiO$_2$, LiCoO$_2$ or LiMn$_2$O$_4$) and a binder (such as CMC) to water (such as ion exchange water) at a suitable mass ratio and mixing. Furthermore, an electrically conductive material may also be added to a preferable composition that composes the active material layer 36. This enables electrically conductive pathways between the active material layer 36 and the electrically conductive layer 34 to be improved.

Water or a mixed solvent consisting mainly of water is preferable for the aqueous solvent for preparing the aqueous electrode paste. One type or two or more types of organic solvents capable of uniformly mixing with water (such as lower alcohols or lower ketones) can be suitably selected and used for the solvent other than water that composes the mixed solvent. For example, an aqueous solvent is used preferably in which roughly 80% by mass or more of the aqueous solvent (more preferably roughly 90% by mass or more and even more preferably roughly 95% by mass or more) is water. A particularly preferable example is an aqueous solvent substantially composed of water (such as water).

Moreover, the positive electrode of the lithium secondary battery 100 disclosed herein is such that a mass ratio (B/A) of the mass (B) per unit surface area of the binder in the active material layer 36 to the mass (A) per unit surface area of the binder in the electrically conductive layer 34 satisfies the relationship of $0.06 \leq B/A \leq 0.35$ (preferably $0.08 \leq B/A \leq 0.33$, and particularly preferably $0.13 \leq B/A \leq 0.30$). Since the non-aqueous electrode paste that forms the electrically conductive layer 34 and the aqueous electrode paste that forms the active material layer 36 constitute laminated layers composed of binders having offsetting properties, there is the risk of a decrease in layer adhesion and interlayer separation under conditions of long-term use or a high rate of charging and discharging. However, in a battery provided with a positive electrode laminated with a composition in which the mass ratio (B/A) of the mass (B) per unit surface area of the binder in the active material layer 36 to the mass (A) per unit surface area of the binder in the electrically conductive layer 34 satisfies the above-mentioned relationship, since mutual adhesion of the active material layer 36 and the electrically conductive layer 34 is extremely superior, the battery is resistant to the occurrence of interlayer separation even when subjected to a high rate of charging and discharging. Consequently, formation of compounds having high electrical resistance that cause corrosion of the positive electrode current collector 32 is prevented and increases in internal resistance can be suppressed.

The active material layer 36 can be formed by applying the prepared aqueous electrode paste for forming an active material layer onto the electrically conductive layer 34 and drying the solvent contained in the paste. A technique similar to the previously listed examples of methods can be suitably employed for applying the aqueous electrode paste for forming an active material layer to the electrically conductive layer 34. In addition, the active material layer 36 may be formed over nearly the entire surface of the electrically conductive layer 34 or formed over only a portion of the surface of the electrically conductive layer 34. Normally, a configuration is preferably employed in which the active material layer 36 is formed so as to at least cover nearly the entire surface of the electrically conductive layer 34 from the viewpoints of taking advantage of the effect of forming the active material layer 36 and durability and the like of the active material layer 36. Furthermore, in the case a portion where the electrically conductive layer 34 is not formed remains on a portion of the positive electrode current collector 32 in an electrode of an aspect in which the electrically conductive layer 34 is formed on the positive electrode current collector 32, a configuration may be employed in which a portion of the active material layer 36 is provided extending to the portion where the electrically conductive layer 34 is not formed within a range that does not remarkably impair the effects of the present invention.

The lithium secondary battery 100 provided with the positive electrode able to be provided by the present invention may be similar to that provided in this type of lithium secondary battery of the related art with the exception of providing a positive electrode composed of the electrically conductive layer 34 and the active material layer 36 as previously described, and there are no particular limitations thereon. Although the following provides an explanation of other constituents, the present invention is not intended to be limited to these embodiments.

For example, the negative electrode sheet 40 can have a configuration in which the negative electrode active material layer 44 is formed on the long negative electrode current collector 42 in the form of a long sheet (such as copper foil). One type or two or more types of substances conventionally used in lithium secondary batteries can be used without any particular limitations for the negative electrode active material capable of occlusion and release of lithium that composes the negative electrode active material layer 44. A preferable example of a negative electrode active material is carbon particles. A particulate carbon material (carbon particles) containing a graphite structure (laminated structure) in at least a portion thereof is used preferably. So-called graphite, hard carbon, soft carbon or carbon materials having a combined structure thereof can be used preferably. In particular, graphite particles can be used as a negative electrode active material suitable for use under conditions of a high rate of charging and discharging since they have a small particle diameter and have a large surface area per unit volume.

One type or two or more types of materials able to be incorporated in a typical lithium secondary battery can be contained as necessary in the negative electrode active material layer 44 in addition to the above-mentioned negative electrode active material. Various types of polymer materials able to function as binders like those listed as examples of constituent materials of the electrically conductive layer 34 and the active material layer 36 can be similarly used as such materials.

The negative electrode active material layer 44 can be preferably produced by coating onto the negative electrode current collector 42 a composition in the form of a paste or slurry prepared by adding a negative electrode active material, binder and the like to a suitable solvent (water, organic solvent or mixed solvent thereof) followed by dispersing or dissolving therein, drying the solvent and compressing.

In addition, the separators 50A and 50B are sheets interposed between the positive electrode sheet 30 and the negative electrode sheet 40, and are arranged so as to respectively contact the electrically conductive layer 34 and the active material layer 36 of the positive electrode sheet 30 and the negative electrode active material layer 44 of the negative electrode sheet 40. The separators 50A and 50B fulfill the roles of preventing short-circuiting accompanying contact between the active material layers 36 and 44 in the positive electrode sheet 30 and the negative electrode sheet 40, as well as forming electrically conductive pathways between the electrodes by allowing electrolyte to impregnate pores in the separators 50A and 50B. Porous sheets (microporous resin sheets) composed of resin can be preferably used for the constituent material of the separators 50A and 50B. Porous polyolefin resins such as polypropylene, polyethylene or polystyrene are particularly preferable.

The electrolyte according to the present embodiment is a non-aqueous electrolyte (and typically, a non-aqueous liquid electrolyte) containing lithium ions that is a non-aqueous solvent-based electrolyte in which a lithium salt is dissolved as a supporting salt in a non-aqueous solvent (organic solvent), and an electrolyte used in a typical lithium secondary battery, for example, can be used. One type or two or more types of non-aqueous solvents such as ethylene carbonate (EC), diethyl carbonate (DEC), dimethyl carbonate (DMC) or propylene carbonate can be preferably used for the non-aqueous solvent that composes the electrolyte. In addition, one type or two or more types of lithium salts such as $LiPF_6$, $LiClO_4$, $LiAsF_6$, $Li(CF_3SO_2)_2N$, $LiBF_3$ or $LiCF_3SO_3$ can be used for the lithium salt used as a supporting salt.

The lithium secondary battery 100 of the present embodiment can be constructed by winding the positive electrode sheet 30 and the negative electrode sheet 40 produced in the manner described above while superimposing both of the two separators 50A and 50B, housing the resulting wound-type electrode body 20 in the battery case 10, and sealing therein after injecting the above-mentioned electrolyte.

Furthermore, there are no particular limitations on the structure, size or material of the battery case 10 (for example, the battery case 10 can be made of metal or a laminated film), or on the structure of the electrode body having the positive and negative electrodes as constituents thereof (for example, a wound-type structure or laminated structure).

Although the following provides an explanation of test examples relating to the present invention, the present invention is not intended to be limited to that indicated in the specific examples.

Positive electrodes for a lithium secondary battery having different mass ratios (B/A) between the mass (B) per unit surface area of the binder in the active material layer and the mass (A) per unit surface area of the binder in the electrically conductive layer were evaluated as to whether or not there are differences in the resistance thereof by measuring their impedances. The specific method is indicated below.

[Production of Positive Electrodes for Lithium Secondary Battery]

Positive electrodes for a lithium secondary battery were produced. Namely, in forming an electrically conductive layer on the positive electrodes, polyvinylidene fluoride (PVDF) as a binder and acetylene black as electrically conductive material were mixed by adding N-methyl-2-pyrrolidone (NMP) so that the mass ratio of these materials as percent by mass was 72:28 to prepare a paste-like composition for forming an electrically conductive layer.

This composition was then coated onto both sides of aluminum foil having a thickness of about 10 μm used as a positive electrode current collector using a coating device. After coating, the coated aluminum foil was dried and spread out into the form of a sheet with a roll press to form the electrically conductive layer on a surface of the positive electrode current collector.

Next, an active material layer was laminated onto the electrically conductive layer. Therefore, a positive electrode active material to be contained in the active material layer was prepared. Namely, an aqueous nickel salt solution and an aqueous alkaline hydroxide solution were added to an aqueous solution in which metal cobalt and aluminum were suspended in advance to precipitate nickel hydroxide using reactive crystallization. The nickel hydroxide and lithium hydroxide were then fired to obtain lithium nickel complex oxide $LiNiO_2$.

The prepared $LiNiO_2$ as a positive electrode active material, acetylene black as an electrically conductive material and carboxymethyl cellulose (CMC) as a binder were mixed with ion exchange water so that the mass ratio of these materials as percent by mass was 100:10:1 to prepare a paste-like composition for forming an active material layer. The prepared composition was coated onto the electrically conductive layer using a coating device, and after removing the water, the coated composition was spread out into the form of a sheet with a roll press to form an active material layer.

At this time, 11 types of samples were prepared each having different having mass ratios (B/A) of the mass (B) per unit surface area of CMC binder in the active material layer to the mass (A) per unit surface area of PVDF binder in the electrically conductive layer. The mass ratios of the 11 samples are shown in Table 1.

TABLE 1

| Sample No. | 1 | 2 | 3 | 4 | 5 | 6 |
|---|---|---|---|---|---|---|
| Mass ratio (B/A) of mass (B) per unit surface area $(g/m^2)$ of CMC in active material layer to mass (A) per unit | 0.2667 | 0.2667 | 0.1333 | 0.0800 | 0.0610 | 0.0476 |

TABLE 1-continued surface area (g/m²) of PVDF in electrically conductive layer

| Sample No. | 7 | 8 | 9 | 10 | 11 |
|---|---|---|---|---|---|
| Mass ratio (B/A) of mass (B) per unit surface area (g/m²) of CMC in active material layer to mass (A) per unit surface area (g/m²) of PVDF in electrically conductive layer | 0.4444 | 0.3333 | 0.3922 | 0.3509 | 0.3509 |

A porous polypropylene separator having a thickness of about 30 μm was interposed between two positive electrode sheets produced by laminating the active material layer onto the electrically conductive layer, and the ends of the positive electrode sheets were joined to external terminals. The laminate of the joined positive electrode sheets and the separator was housed in a laminated case and electrolyte was injected into the case. An electrolyte obtained by dissolving an $LiPF_6$ supporting salt at a concentration of 1 mol/L in a mixed solvent of ethylene carbonate (EC), dimethyl carbonate (DMC) and ethyl methyl carbonate (EMC) mixed at a volume ratio of 1:1:1 was used for the electrolyte. The opening of the case was then sealed after injecting the electrolyte.

Subsequently, after carrying out suitable electrolyte impregnation treatment (such as vacuum impregnation treatment to a pressure of 200 Torr) and allowing the electrolyte to adequately impregnate the pores of the positive electrode, the impedances of samples 1 to 11 were measured. The impedances were measured by sweeping through measurement frequencies, and direct current resistance was read from a Cole-Cole plot.

Figure 4:
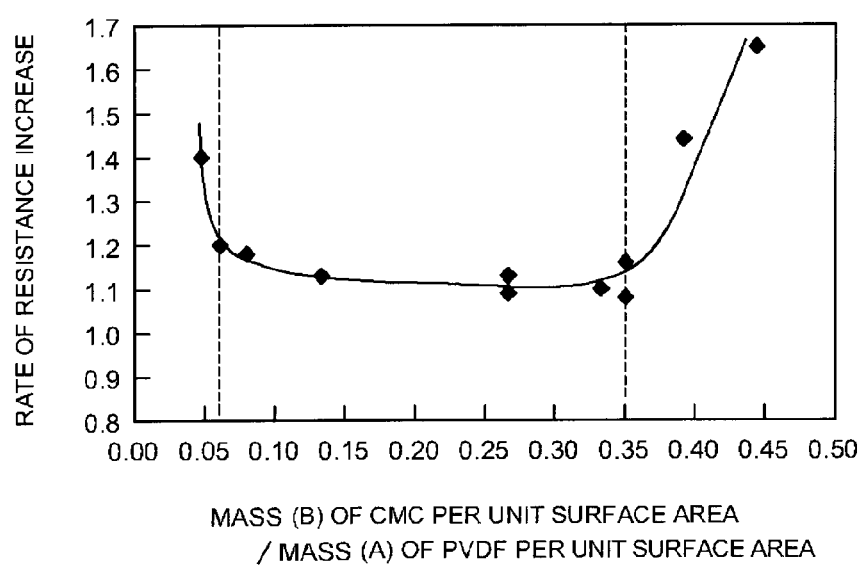
FIG. 4 is a graph indicating the rate of increase in resistance relative to the mass ratio between binders per unit surface area in an active material layer and electrically conductive layer of a positive electrode for a lithium secondary battery produced in an example; and, FIG. 5 is a side view schematically showing a vehicle (automobile) equipped with the lithium secondary battery of the present invention.

Furthermore, the impedances were measured in the same manner after storing the samples 1 to 11 for 3 days at 60° C. Those results are shown in FIG. 4. Furthermore, the mass ratios (B/A) of the mass (B) per unit surface area of CMC binder in the active material layer to the mass (A) per unit surface area of PVDF binder in the electrically conductive layer are plotted on the horizontal axis of FIG. 4, while rates of increase in direct current resistance after storing for 3 days at 60° C. obtained from the results of measuring the impedances thereof.

As shown in FIG. 4, the rates of increase were 1.2 or less in those samples in which the mass ratio (B/A) of the mass (B) per unit surface area of CMC binder in the active material layer to the mass (A) per unit surface area of PVDF binder in the electrically conductive layer was 0.06 or more to 0.35 or less. In particular, sample 4 in which the mass ratio (B/A) was 0.0800, sample 3 in which it was 0.1333, samples 1 and 2 in which it was 0.2667, sample 8 in which it was 0.3333 and sample 11 in which was 0.3509 all demonstrates rates of increase of less than 1.2 indicating small increases in resistance caused by separation.

Although the above has provided a detailed description of the present invention, the embodiments and examples thereof are merely exemplary, and various variations and modifications of the above-mentioned specific examples are included in the present invention disclosed herein. For example, the present invention is not limited to a wound-type battery as described above, but rather can be applied to various types of lithium secondary batteries. In addition, the size and other configurations of the battery can be suitably modified according to the application (and typically, vehicle mounting).

INDUSTRIAL APPLICABILITY

Figure 5:
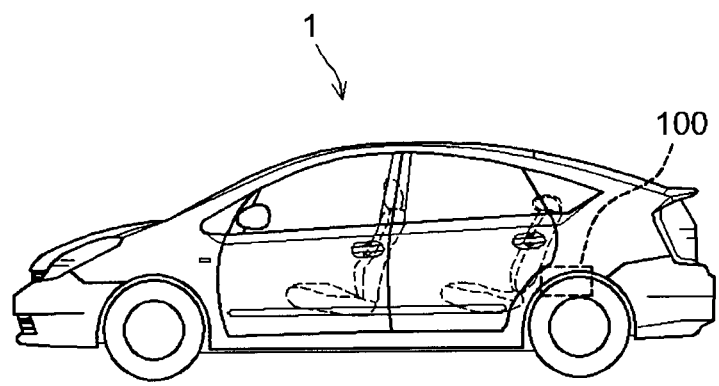

As a result of the lithium secondary battery 100 according to the present invention being provided with the electrically conductive layer 34 on a surface of the positive electrode current collector 32 and the active material layer 36 laminated onto the electrically conductive layer as previously described, a lithium secondary battery can be obtained that is resistant to interlayer separation even when subjected to a high rate of charging and discharging, and compounds having high resistance that cause corrosion of the positive electrode current collector 32 are unlikely to be formed. As a result of having these characteristics, the lithium secondary battery 100 provided with the positive electrode according to the present invention can be preferably used as a power source for motors installed in vehicles such as automobiles in particular. Thus, as shown in FIG. 5, a vehicle 1 (typically an automobile, and particularly an automobile provided with a motor in the manner of a hybrid vehicle, electric vehicle or fuel cell vehicle) is provided with the lithium secondary battery 100 (that can also be in the form of a battery assembly that is formed by connecting a plurality of the lithium secondary batteries 100 in series) as a power source thereof.

The invention claimed is:

1. A positive electrode for a lithium secondary battery, the positive electrode comprising:
    a positive electrode current collector;
    an electrically conductive layer laminated on a surface of the positive electrode current collector, said electrically conductive layer comprising an electrically conductive material and a first binder, and said electrically conductive layer not comprising a positive electrode active material; and
    a positive electrode active material layer laminated on the electrically conductive layer, said active material layer comprising a positive electrode active material and a second binder, wherein
    the first binder in the electrically conductive layer consists of at least one type of water-insoluble polymer that is soluble in an organic solvent,
    the second binder in the active material layer consists of at least one type of water-soluble polymer and/or water-dispersible polymer that dissolves or disperses in water, and wherein
    a mass ratio (B/A) of mass (B) per unit surface area of the water-soluble and/or water-dispersible binder in the active material layer to mass (A) per unit surface area of the water-insoluble binder in the electrically conductive layer satisfies a relationship of $0.06 \leq B/A \leq 0.35$.

2. The positive electrode according to claim 1, wherein a content of the electrically conductive material in the electrically conductive layer is 20% by mass or more to 50% by mass or less based on a value of 100% by mass for a total amount of the water-insoluble polymer and the electrically conductive material in the electrically conductive layer.

3. The positive electrode according to claim 1, wherein polyvinylidene fluoride is contained as the water-insoluble binder in the electrically conductive layer, and carboxymethyl cellulose is contained as the water-soluble and/or water-dispersible binder in the active material layer.

4. The positive electrode according to claim 1, wherein an electrically conductive material is contained in the active material layer.

5. A method for producing a positive electrode for a lithium secondary battery provided with a laminated structure formed of an electrically conductive layer on a surface of a positive electrode current collector and a positive electrode active material layer laminated on the electrically conductive layer, the method comprising:
 forming the electrically conductive layer using a composition comprising an electrically conductive material and a first binder, wherein the electrically conductive layer and the composition do not comprise a positive electrode active material, and wherein the first binder consists of at least one type of water-insoluble polymer that is soluble in an organic solvent; and
 forming the positive electrode active material layer using a composition comprising a positive electrode active material and a second binder, wherein the second binder consists of at least one type of water-soluble polymer and/or water-dispersible polymer that dissolves or disperses in water, wherein
 the laminated structure is formed so that a mass ratio (B/A) of mass (B) per unit surface area of the water-soluble and/or water-dispersible binder in the active material layer to mass (A) per unit surface area of the water-insoluble binder in the electrically conductive layer satisfies a relationship of $0.06 \leq B/A \leq 0.35$.

6. The production method according to claim 5, wherein the electrically conductive layer is laminated such that a content of the electrically conductive material in the electrically conductive layer is 20% by mass or more to 50% by mass or less based on a value of 100% by mass for a total amount of the water-insoluble polymer and the electrically conductive material in the electrically conductive layer.

7. The production method according to claim 5, wherein polyvinylidene fluoride is used for the water-insoluble binder in the electrically conductive layer, and carboxymethyl cellulose is used for the water-soluble and/or water-dispersible binder in the active material layer.

8. A lithium secondary battery comprising the positive electrode according claim 1.

9. A vehicle, the vehicle comprising the lithium secondary battery according to claim 8.

* * * * *